United States Patent [19]

Stricklen et al.

[11] Patent Number: 5,331,086
[45] Date of Patent: Jul. 19, 1994

[54] DEASHING PROCESS FOR POLYOLEFINS USING AN ALPHA,BETA-UNSATURATED KETONE

[75] Inventors: Phil M. Stricklen, Bartlesville, Okla.; Calvin E. Moore, Houston, Tex.; Dennis G. Glascock, Bartlesville, Okla.

[73] Assignee: Phillips Petroleum Company, Bartlesville, Okla.

[21] Appl. No.: 90,674

[22] Filed: Jul. 12, 1993

Related U.S. Application Data

[63] Continuation of Ser. No. 769,902, Oct. 1, 1991, abandoned.

[51] Int. Cl.⁵ .............................................. C08F 6/08
[52] U.S. Cl. ................................................ 528/493
[58] Field of Search ........................................ 528/493

[56] References Cited

U.S. PATENT DOCUMENTS

| | | | |
|---|---|---|---|
| 3,014,019 | 12/1961 | Czenkusch | 528/493 |
| 3,318,857 | 5/1967 | Dietz | 528/493 |
| 3,332,920 | 7/1967 | Clark | 528/493 |
| 3,342,794 | 9/1967 | Buchanan | 528/493 |
| 3,423,384 | 1/1969 | Hagemeyer et al. | 528/493 |
| 3,489,735 | 1/1970 | Clark | 528/493 |
| 4,051,313 | 9/1977 | Luciani et al. | 528/496 |

*Primary Examiner*—Joseph L. Schofer
*Assistant Examiner*—Tom Weber
*Attorney, Agent, or Firm*—Morrison Bennett

[57] ABSTRACT

A dicarbonyl compound and an alpha,beta-unsaturated ketone are used to deactivate a transition metal/organometal catalyst in polymerization of at least one monomer to form a 1-olefin polymer. The polymer is deashed with a lower alcohol optionally followed by a wash with the starting monomer or n-heptane.

22 Claims, No Drawings

DEASHING PROCESS FOR POLYOLEFINS USING AN ALPHA,BETA-UNSATURATED KETONE

This application is a continuation of application Ser. No. 07/769,902, now abandoned.

BACKGROUND OF THE INVENTION

This invention relates to catalyst deactivation and removal of catalyst residues from polymers.

Various processes for polymerizing olefins are described in the literature. A typical approach is to carry out the polymerizations in the presence of a transition metal compound catalyst and an organometallic compound cocatalyst. One of the problems encountered with polymers prepared by such processes concerns the presence in the polymer of catalyst residues. The presence of these catalyst residues in the polymer adversely affects the heat stability, color, electrical properties and, in the case of clear resins, transparency. The halide components of catalyst residues can cause corrosion of processing and molding equipment.

For polyolefins which require high processing temperatures, catalyst removal is even more critical since higher temperatures may magnify adverse effects of the catalyst residues.

The process by which catalyst residue impurities are removed, or extracted, from a polyolefin is referred to as "deashing". Various methods for extracting catalyst residues from polyolefins have been developed. These commonly involve treating the polymer with a variety of agents and adjuvants. Treating agents such as dicarbonyl compounds which contain the group

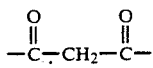

used in conjunction with alkylene oxide adjuvants have been shown to be useful for extracting catalyst residues from polyolefins such as polypropylene. (See U.S. Pat. No. 3,219,647). The dicarbonyl compounds also serve to deactivate the catalyst and cocatalyst thereby terminating the polymerization reaction. Additionally, the dicarbonyl compounds enhance the solubility of the catalyst residues for the subsequent extraction process. A subsequent rinse or wash of the polymer with an alcohol, a paraffinic hydrocarbon or monomer facilitates extraction.

The chelating reaction of dicarbonyl compounds with metal halide catalysts converts the metal to an extractable form and is accompanied by the evolution of hydrogen halide. Metal constituents of the organometallic cocatalyst also react with dicarbonyl compounds in this way. Depending on the nature of the cocatalyst, this reaction may also be accompanied by the evolution of hydrogen halide.

The alkylene oxide treating agent is employed as an adjuvant to remove the hydrogen halide which would otherwise inhibit the chelating reaction, thereby slowing down the rate of metal extraction.

One problem area encountered when using conventional methods for deashing catalysts in polymer production is the necessity of multiple separations to recover unreacted monomer from the reaction solution after the polymer product is separated. This is especially a problem when polymers of branched higher alpha olefins are being made because of the relative boiling points of the unreacted monomer and the alkylene oxides. Use of low boiling alkene oxides with dicarbonyl compounds for deashing polymers formed in polymerization of 1-olefin monomers with transition metal/organometal catalysts requires use of an additional separation column to separate the light (low boiling) alkylene oxides from the branched olefin monomer.

Another problem which has been observed when using conventional methods to remove catalyst residues from polyolefins of branched 1-olefin monomers, particularly those monomers with at least one substituent in the three position of the olefin, is the relatively high level of catalyst residues in the polymer. This problem may be due to low productivity in the polymerization process. Polymerizations of branched 1-olefins are typically low yield reactions due to the sterically hindered structure of the monomer. As a result, catalyst residues will exist at high levels in the polymer. Thus, effective deashing methods are important.

SUMMARY OF THE INVENTION

It is an object of this invention to obtain good removal of catalyst residues from polymers of 1-olefin monomers.

It is an object of this invention to provide a process for deashing polymers while reducing the number of unit operations required for separations of the polymer product, the unreacted monomer, the catalyst residues and reaction solvents.

In accordance with one embodiment of this invention a method is provided which is effective for deashing polymers by use of dicarbonyl compounds as chelating agents and certain ketones as adjuvant materials followed by one or more suitable washes. The wash or washes may be: (a) one or more alcohols; (b) one or more alcohols proceeded by or followed by one or more hydrocarbon washes; or (c) one or more hydrocarbon washes. The hydrocarbon washes may be any of various hydrocarbons, particularly paraffinic hydrocarbons or one or more of the same olefin monomers used in the polymerizations. Use of these invention methods substantially reduces the catalyst residue impurities in the polymerization products of 1-olefin monomers, particularly those branched in the three position. Use of these invention methods eliminates need for as many separation steps in the unreacted monomer recovery process.

Another embodiment of this invention is a process comprising: polymerization of at least one monomer in the presence of a catalyst to form a polymerization reaction mixture; treating that polymerization mixture with an alpha,beta-unsaturated ketone; separating polymer substantially free of catalyst residue from the reaction mixture. In this embodiment, the catalyst comprises: (a) a transition metal compound chosen from the group consisting of the elements in Groups IV, V, VI and VIII of the Periodic Table; and (b) an organometallic compound cocatalyst selected from the group of elements in Groups I, II and III of the Periodic Table.

In yet another embodiment of this invention, the catalyst additionally comprises a propolymer.

A further embodiment is a process comprising: polymerization of at least one monomer in the presence of a catalyst to form a polymerization reaction mixture; treating the polymerization reaction mixture with at least one dicarbonyl compound and with at least one alpha,beta-unsaturated ketone; separating the polymer from the reaction mixture. Then the unreacted monomer and solubles may be separated from the remaining reaction mixture in an efficient manner.

DETAILED DESCRIPTION OF THE INVENTION

One commonly used method of making valuable high melting point 1-olefin polymers is polymerization of appropriate monomers using a transition metal/organometal catalyst system.

Generally most desired are semi-crystalline polymers, the generally more preferred of which would be those having an isotactic structure. Generally, least desired are highly atactic, randomly structured polymers referred to in this application as "soluble polymer" or simply as "solubles".

This invention is particularly useful in deashing of polypropylene or branched higher alpha-olefin polymers.

Monomers contemplated as useful in this invention include 1-olefins and/or conjugated diolefins containing from 2 to about 20 carbon atoms such as ethylene, 1-butene, 1-pentene, 1-hexene, 1-heptene, 1-octene, 1,3-butadiene, isoprene, 1-decene, 1-dodecene, 1-tetradecene, 1-hexadecene, 2-methoxybutadiene, 1-eicosene, 1,3-dicosadiene, and branched alpha-olefins.

It is to be understood that mixtures of two or more monomers can be employed in the polymerization to produce copolymers which are then treated by the present process. Examples of such copolymers include ethylene-propylene and ethylene-butane-1.

The branched alpha-olefin polymers useful in this invention are homopolymers and copolymers of branched alpha-olefins. The preferred branched alpha-olefin monomers have from about 3 to about 12 carbon atoms. Exemplary monomers include, but are not limited to, propylene, 3-methyl-1-butene, 3-methyl-1-pentene, 3-methyl-1-hexene, 4-methyl-1-pentene, 4-methyl-1-hexene, 3,3-dimethyl-1-butene, 2,3-dimethyl butadiene, 4,4-dimethyl-1-hexene, 4,5-dimethyl-1-octane, 4-ethyl-]-octadecene, 6-methyl-1-dodecene, 4,6-diethyl-1,3-decadiene, and other similar monomers. Most preferably, polymers of 4-methyl-1-pentene (4MP1), also called polymethylpentene (PMP), and 3-methyl-1-butane (3MB1), also called polymethylbutane (PMB) are used. Table I gives the approximate melting point of some of the homopolymers indicated above.

TABLE I

Melting Points of Exemplary Branched Higher Alpha-Olefin Homopolymers

| Polymerized Monomer | Approx. Melting Temp., °C. |
|---|---|
| Propylene | 170 |
| 3-methyl-1-butene | 300 |
| 3-methyl-1-pentene | 370 |
| 4-methyl-1-pentene | 240 |
| 4-methyl-1-hexene | 196 |
| 3-ethyl-1-hexene | 425 |
| 3,3-dimethyl-1-butene | 400 |
| 4,4-dimethyl-1-hexene | 350 |

The term "branched alpha-olefin polymer", as used in this disclosure, includes homopolymers, as well as copolymers. Copolymers comprise the product resulting from combining a branched alpha-olefin with another branched alpha-olefin or any other olefin monomer or monomers. For example, a branched alpha-olefin can be polymerized in the presence of, or in series with, one or more olefin monomers. Generally, applicable comonomers have from about 2 to about 18 carbon atoms and preferably have from about 8 to about 16 carbon atoms.

Most preferably, the comonomer or comonomers are alpha-olefins. Longer chain linear olefins are preferred in that they can impart increased clarity, toughness, and impact strength to the resultant polymer. Exemplary comonomers include, but are not limited to, 1-octene, 1-decene, 1-dodecene, 1-tetradecene, 1-hexadecene, 1-octadecene and other higher olefins. Mixtures of two or more homopolymers and/or copolymers can be used in this invention.

When using branched alpha-olefin polymers, in general, it is preferred for the polymer to comprise at least about 85 mole percent moieties derived from branched alpha-olefins, and more preferably, at least about 90 mole percent. Most preferably, the polymer comprises at least about 95 mole percent moieties derived from branched alpha-olefins, which results in a polymer of superior strength and a high melting point.

First and second generation transition metal/organometal catalyst systems may be used in the practice of this invention. These systems comprise a catalyst selected from a metal compound of an element from Groups IV, V, VI and VIII of the Periodic Table and a cocatalyst selected from an organometal compound of an element chosen from Groups I, II and III of the Periodic Table. Commonly the catalyst is an inorganic or organic compound of titanium or vanadium, generally titanium. Titanium halides such as the trihalides and tetrahalides, e.g., $TiCl_3$, $TiCl_4$, are often used. The cocatalyst is generally an organoaluminum compound such as an alkylaluminum and/or alkylaluminum halide. Suitable examples include, but are not limited to, triethylaluminum, trimethylaluminum, triisobutylaluminum, diethylaluminum chloride, ethylaluminum sesquichloride, and the like.

Third and fourth generation catalysts which are contemplated as useful in the practice of this invention are solid compounds comprising Ti, Mg, and a halogen, especially chlorine, all in combined form. Generally, when these catalysts are used, the atom ratio of Mg to Ti can range from about 10 to about 25, more preferably from about 14 to about 22. Other compounds can be included in the catalyst including aluminum trichloride, silica, electron donors such as esters, ethers, phenols and the like and mixtures thereof. When used, the inorganic compounds will constitute from about 0.5 to about 10 weight percent of the finished catalyst. When used, the electron donor(s) can initially constitute from about 5 to about 25 weight percent of the finished catalyst. The amount actually retained can be less depending upon the volatility of the electron donor and the method employed during the mixing process, e.g., temperature, duration of process and other variables. The retained amount can be readily determined by one skilled in analysis.

The catalyst and cocatalyst used can be prepared in the manner described in U.S. Pat. No. 4,210,738 or as described in Example I of U.S. Pat. No. 4,425,257, both of which are hereby incorporated herein by reference.

A presently preferred catalyst system for polymerizing branched alpha-olefins comprises titanium trichloride as catalyst and diethylaluminum chloride as cocatalyst as disclosed in British patent 942,297, which is hereby incorporated herein by reference. Mole ratios of diethylaluminum chloride to titanium in the catalyst system can range from about 1 to about 250 or more, preferably from about 3 to about 10.

A portion of the solid catalyst component can be a polymer of a 1-olefin. The olefin may be the same or different from the 1-olefin being polymerized with the catalyst. Preferably the 1-olefin prepolymer is a polymer of a branched 1-olefin such as propylene, 3-methyl-1-butene, 4-methyl-1-pentene, 3-methyl-1-pentene, 3,3-dimethyl-1-pentene and the like. This prepolymer catalyst can have advantages over a catalyst containing no 1-olefin prepolymer by producing less soluble polymer during polymerization, especially in the early stages of the polymerization.

A prepolymer can be applied by sequential polymerization in the main polymerization reactor, or applied in a separate step, allowing a smaller reactor vessel to be used. The catalyst, cocatalyst, and any catalyst modifiers which may be used are usually combined in a diluent. The 1-olefin monomer for making the prepolymer is added and allowed to polymerize to completion. When used, an amount of prepolymer effective to reduce solubles production during polymerization or to enhance the polymer particle morphology is employed. Use of too little prepolymer will result in lack of any benefit. Use of too much prepolymer could cause changes of properties in the product polymer. The amount of monomer can be from 0.1 to 100 times the amount of catalyst. Preferably, the amount of monomer is from 0.1 to 10 times the amount of catalyst. Most preferably, the amount of prepolymer monomer is from 0.5 to 2.0 times the amount of catalyst. The temperature for preparing the prepolymer catalyst can be from $-20°$ to $90°$ C., preferably, from $0°$ to $50°$, most preferably from $15°$ to $25°$ C.

Although not essential, it is often desirable to carry out the polymerization in the presence of hydrogen. The molecular weight of the polymer formed is regulated by the amount of elemental hydrogen present during polymerization. The greater the amount of hydrogen present, the lower the polymer molecular weight.

The polymers formed are more or less crystalline with an ordered backbone structure. Several structures are possible such as atactic (random), isotactic (greatly desired, similar R groups on one side of the main chain) and syndiotactic (similar R groups alternate on either side of the main chain).

To enhance stereospecificity, one or more adjuvants such as aluminum trichloride, silica, electron donors (alcohols, esters, ethers, phenols, etc.) can be used with either the catalyst or cocatalyst or both. Alcohols, esters, ethers or phenols would be added when making the catalyst or cocatalyst or both. The silanes can be added later. Adding such compounds to increase stereospecificity can decrease catalytic activity, however.

One embodiment of the invention is the use of a chelating dicarbonyl compound and an alpha,beta-unsaturated ketone (and/or chemically related compounds) to deactivate the catalyst remaining after polymerization of at least one 1-olefin monomer to form at least one 1-olefin polymer and to convert the catalyst residues into a soluble form which can be washed out of the polymer with a suitable liquid.

Another embodiment of the invention is the use of an alpha,beta-unsaturated ketone without using a chelating dicarbonyl compound to deactivate the catalyst remaining after: polymerization of at least one 1-olefin monomer to form at least one 1-olefin polymer and to convert the catalyst residues into soluble form which can be washed out of the polymer with a suitable liquid.

The dicarbonyl compounds used with the adjuvants of this invention are those materials containing the group:

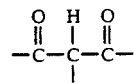

Such materials are those selected from the group consisting of (a) compounds of the general formula:

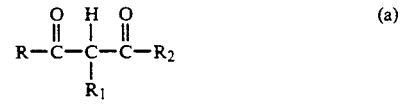

and (b) compounds of the general formula:

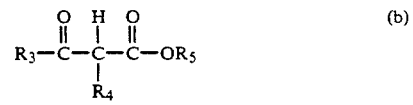

wherein R and $R_2$ are groups selected from alkyl, cycloalkyl, aryl, aralkyl, alkaryl, alkylcycloalkyl, cycloalkyalkyl groups and structures wherein R and $R_2$ are joined to form a cyclic structure;

wherein R and $R_2$ do not have to be the same;

wherein $R_1$ is selected from the group of hydrogen, alkyl, cycloalkyl, aryl, alkaryl, aralkyl, alkylcycloalkyl, and cycloalkylalkyl groups;

wherein $R_1$ does not have to be the same as R;

wherein $R_1$ does not have to be the same as $R_2$;

wherein $R_3$ is selected from the group of alkyl, cycloalkyl, aryl, aralkyl, alkaryl, alkylcycloalkyl, cycloalkylalkyl and $OR_5$ groups;

wherein $R_4$ is selected from the group of hydrogen and alkyl, cycloalkyl, aryl, aralkyl, alkaryl , alkylcycloalkyl, cycloalkylalkyl and $OR_5$ groups;

wherein $R_3$ and $R_4$ do not have to be the same;

wherein $R_5$ is selected from the group of alkyl, cycloalkyl, aryl, aralkyl, alkaryl, alkylcycloalkyl, cycloalkylalkyl;

wherein $R_4$ and $R_5$ do not have to be the same; and wherein $R_4$ and $R_5$ do not have to be the same.

The number of carbon atoms in each of R, $R_1$ and $R_2$ can be from 1 to about 8.

The number of carbon atoms in $R_3$, $R_4$ and $R_5$ can be from 1 to about 8.

Typical of such compounds are 2,4-pentanedione (acetylacetone), 2,4-hexanedione, 2,4-heptanedione, 5-methyl-2,4-hexanedione, 2,4-octanedione, 5,5-dimethyl-2,4-hexanedione, 3-ethyl-2,4-pentanedione, 2,2-dimethyl-3,5-nonanedione, 1-cyclohexyl-1,3-butanedione, 5,5-dimethyl-1,3-cyclohexanedione, 1-phenyl-1,3-butanedione, 1-(4-biphenylyl)-1,3-butanedione, 1-phenyl-1,3-pentanedione, 1-phenyl-5,5-dimethyl-2,4-hexanedione, 1,3-diphenyl-1,3-propanedione, 1,4-diphenyl-1,3-butanedione, 1-phenyl-2-benzyl-1,3-butanedione, 1-phenyl-3-benzyl-9,11-nonadecanedione, 8,10-heptadecanedione, 8-ethyl-7,9-heptadecanedione, 6-octyl-5,7-undecanedione, 4-phenyl-3,5-heptanedione, 1,3-cyclohexanedione, ethyl acetoacetate, methyl acetoacetate, n-propyl acetoacetate, isopropyl acetoacetate, tert-butyl acetoacetate, diethyl malonate, dimethyl malonate, di-n-propyl malonate, diisopropyl malonate, ditert-butyl malonate, octyl acetoacetate, heptyl acetoacetate, phenyl acetoacetate, diphenyl malonate, dicyclohexyl malonate, dicyclohexyl octylmalonate, dihexyl phenylmalonate, ethyl 3-oxopentanoate, octyl-3-oxoundecanoate, methyl 3-oxo-4-phenylbutanoate, ethyl 3-oxo-5-phenylpentanoate, octyl 3-oxo-2-phenylundecanoate, octyl 3-oxo-2-octylundecanoate, cyclohexyl 3-oxo-6-cyclopentylhexanoate, and the like.

Of the various compounds represented by these formulas, acetylacetone is presently preferred.

The alpha,beta-unsaturated ketones used as adjuvants in this invention include alpha,beta-unsaturated carbonyl ketones within the formula:

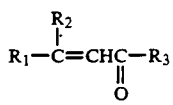

wherein $R_1$ and $R_2$ are hydrogen or alkyl or alkoxy groups having 1 to about 8 carbon atoms;
wherein $R_3$ is an alkyl or alkoxy group having 1 to about 8 carbon atoms; and
wherein $R_1$, $R_2$ and $R_3$ can be the same or different.

The alpha,beta-unsaturated ketones are believed to aid in the deashing of the catalyst in two ways. First, the carbon-carbon bond of the alpha,beta-unsaturated ketone can undergo electrophilic addition of acids, so the alpha,beta-unsaturated ketone can act as a scavenger of the hydrochloric acid produced by tile reaction of a dicarbonyl compound with a metal halide compound. The second mode of deashing would be to serve as a chelating compound which increases the solubility of the metal compounds in the organic liquid.

Examples of useful alpha,beta-unsaturated ketones include, but are not limited to, 4-methyl-3-penten-2-one (mesityl oxide), 4-methyl-3-hexene-2-one, 4-methyl-3-heptene-2-one, 4-methyl-3-octene-2-one, 4-ethyl-3-heptene-2-one, 4-ethyl-3-octene-2-one, 2-methyl-2-hexene-4-one, 2-methyl-2-heptene-4-one, 2-methyl-2-octene-4-one, 3-methyl-3-heptene-4-one, 3-methyl-3-octene-4-one. A mixture of two or more of these may be used.

The presently preferred alpha,beta-unsaturated ketone is mesityl oxide. Mesityl oxide which is in an equilibrium mixture with up to about 10 or more weight percent isomesityl oxide can be used in this invention. The mesityl oxide should be present in an amount sufficient to function as an effective halide scavenger.

The chelator and adjuvant can be introduced separately or as a mixture directly into the reactor, or they can be introduced in combination in solution in an inert hydrocarbon.

The molar equivalents of the dicarbonyl compound needed are based on the total molar equivalents of the metal compounds present and the molar equivalents of alpha,beta-unsaturated ketone needed are based on the molar equivalents of halide present. An excess of both compounds is generally added to assure complete reaction. The molar equivalents of the dicarbonyl compound to total metal compound equivalents can range from about 3 to 50 or more. A presently preferred range of about 6 to about 40 is favored and most preferred is a range of about 6 to about 12. The molar equivalents of alpha,beta-unsaturated ketone to total halide can range from about 1 to 50 or more, more preferably from about 2 to about 30, and most preferably from about 2 to about 10, based on the molar equivalents of halide present.

In polymerization of branched alpha-olefin monomers the reaction product formed may contain up to about 10 percent solubles. These solubles (polymer which is in solution) are the result of two causes. The polymer which has high atactic content will be soluble in the liquid diluent. In addition, polymer having low molecular weight and/or high comonomer content will also have higher solubility and will be soluble in the liquid.

An important advantage which use of a dicarbonyl compound/alpha,beta-unsaturated ketone catalyst deactivating/deashing system has over a dicarbonyl compound/alkylene oxide system is the greater ease with which the unreacted branched olefin monomer can be recycled. For example, when propylene oxide is used to deash polymers having monomers which boil at a higher temperature than propylene oxide, (34° C.), an additional fractionation column must be added to the monomer recycle system to remove the low boiling propylene oxide. The 129° C. boiling point of mesityl oxide allows monomers having boiling points lower than 129° C. to be recycled using a single fractionation column.

Another embodiment of this invention comprises: deashing of the polymer containing the deactivated and solubilized catalyst residues produced by transition metal/organometal polymerization of a branched 1-olefin monomer; addition of at least 3 molar equivalents of a dicarbonyl compound based on total molar equivalents of the metal compounds present and at least 1 molar equivalent of an alpha,beta-unsaturated ketone based on the molar equivalents of halide present; and draining or flashing the unreacted monomer from the polymer slurry. The deashing of the polymer is accomplished by contacting and mixing the polymer contained in the reactor in the substantial absence of oxygen and moisture at least once with a lower alkanol, preferably isopropanol or methanol, optionally followed or preceeded by a hydrocarbon wash such as with n-heptane or with a monomer identical to at least one of the monomers being polymerized. Optionally the liquid which contains catalyst residues can be removed without draining or flashing by use of a countercurrent wash method.

More than one alcohol wash may be used, either in a process using only alcohol washes or in a process using alcohol washes followed or preceeded by one or more hydrocarbon washes such as with n-heptane or with a monomer identical to at least one of the monomers being polymerized. Generally, lower alkanols with from 1 to about 8 carbon atoms are considered most useful as alcohol washes.

Alternatively, the polymer produced as described above can be washed with only monomer identical to at least one of the monomers being polymerized. This method obviates the need for additional waste streams to deal with alcohols or other hydrocarbon washes such as the commonly used n-heptane.

In another embodiment of this invention a branched 1-olefin monomer is polymerized using a transition metal/organometal catalyst, the polymerization reaction is deactivated with at least 3 molar equivalents of a dicarbonyl compound based on total molar equivalents of the metal compounds present and at least 1 molar equivalent of an alpha,beta-unsaturated ketone based on the molar equivalents of halide present. Then, instead of draining the unreacted monomer and the solubles off in a waste stream, the unreacted monomer is vented from the reaction leaving the solubles with the polymer. In polymerization of 1-olefin monomers which are branched in the three position, the reaction product formed may contain up to about 1.0 percent solubles. After venting the unreacted monomer, the polymer product containing the solubles is washed in a suitable manner so as to remove the catalyst residues but not the soluble polymer. Resin properties of polymers produced in this way may be somewhat affected, but the resins can be useful for certain applications.

The polymerizations of the embodiments of this invention can be carried out using either continuous or batch processes.

EXAMPLE I

While employing anhydrous conditions and reactants and in the absence of oxygen, 4MP1 was polymerized at about 50° C. in a stainless steel, jacketed, stirred reactor of 30 gallon capacity. Each run was conducted by charging the reactor with 20 gallons of 4MP1 (111 lbs.) as monomer/diluent, 120 g of DEAC solution (25 wt. % in n-heptane) equivalent to 30 g DEAC (250 mmoles) as cocatalyst, comonomer (if used), elemental hydrogen supplied from a vessel of 2.5 gallon capacity and the TiCl$_3$prepolymer catalyst consisting of 50 wt. % TiCl$_3$ and 50 wt. % prepolymer. The reactor was pressured with a slight positive pressure of nitrogen and heated to 50° C. Polymerization runs of 2 hours duration were used unless indicated otherwise. Each run was terminated by charging the reactor with a suitable amount of the specified deactivating/solubilizing agent and stirring the reactor contents for 25 minutes at the run temperature. Unreacted monomer containing solubilized catalyst was drained from the reactor into a receptacle for further processing. The reactor containing the solid polymer was charged with 10 gallons of n-heptane and the polymer slurry was mixed for about 10 minutes then discharged into a vacuum filter where the hydrocarbon now containing solubilized catalyst residues was at least partly separated from the solid polymer particles. The reactor was rinsed with an additional 5 gallons of n-heptane and the wash liquid plus any remaining polymer was discharged into the filter. The polymer slurry was washed in the filter with isopropanol alone or with the specified wash liquid. The isolated polymer was recovered, dried and weighed.

The Ti and Al residue levels were determined by plasma emission. The chloride levels were determined by neutron activation.

The conditions used and the results obtained in each of five runs are shown in Tables II and III.

TABLE II

| | | Production of 4-methyl-1-pentene Polymers | | | | | | |
|---|---|---|---|---|---|---|---|---|
| Run Number | Time Hours | Calculated TiCl$_3$[a] g | | Mole Ratio DEAC/ TiCl$_3$ | Polymer | | Productivity, g/g TiCl$_3$ | Hydrogen $\Delta$psig[c] | 1-Decene g |
| | | | mmoles | | Yield, g | Melt Flow,[b] g/10 min | | | |
| 1[d] | 1 | 0.1112 | 0.721 | 8.3 | 88 | 13.4 | 791 | 60 | 0 |
| 2[e] | 1½ | 4.905 | 31.8 | 7.9 | 7185 | 27.8 | 1465 | 200 | 760 |
| 3 | 2 | 5.047 | 32.7 | 7.6 | 9489 | 105 | 1880 | 300 | 0 |
| 4 | 3 | 5.1445 | 33.3 | 7.5 | 8528 | 72.9 | 1658 | 200 | 730 |
| 5 | 3 | 4.922 | 31.9 | 7.8 | 11004 | 77.8 | 2236 | 400 | 0 |

[a]Run 1. only TiCl$_3$ present. no prepolymer: used 0.721 g (6 mmoles) DEAC as cocatalyst.
[b]In accordance with ASTM D-1238. 260° C., 5 kg total load.
[c]Pressure drop across a 2.5-gallon vessel.
[d]Polymerization was conducted in a 1-gallon stirred reactor. 2000 g of 4-methyl-1-pentene was used and hydrogen was measured from a 300 mL cylinder.
[e]Runs 2-5, catalyst consisted of 50 wt. % TiCl$_3$ and 50 wt. % applied prepolymer. Actual total catalyst weight is twice the above values.

TABLE III

| | Catalyst Deactivation/Solubilization and Results Obtained | | | | | | | | |
|---|---|---|---|---|---|---|---|---|---|
| Run Number[a] | Deactivating Agent[b] | | | Insoluble Polymer wt. %[c] | Mole % Comonomer Incorporation | Catalyst Residue, ppm | | | Remarks |
| | Name | mL | moles | | | Ti | Al | Cl | |
| 1 | none used | 0 | 0 | nd[d] | na[d] | 250 | nd | 1240 | control |
| 2 | MO | 291 | 2.55 | 89.9 | 1.99 | 12 | 150 | 234 | invention |
| 3 | AA/MO | 190/75 | 1.9/0.7 | 96.6 | na | 4.7 | 86.2 | nd | invention |
| 4 | AA/MO | 190/75 | 1.9/0.7 | 88.2 | 1.40 | 1.3 | 8.6 | 46 | invention |
| 5 | AA/PO | 120/70 | 1.2/1 | 93.1 | na | 1.9 | 4.9 | 42 | comparison |

[a]The runs shown in each table are the same. Only different sets of data are presented.
[b]AA = acetylacetone; MO = mesityl oxide; PO = propylene oxide.
[c]Percentage insoluble in the monomer.
[d]nd = not determined; na = not applicable.

The results shown in Table II are primarily concerned with the polymerization conditions employed and the results obtained. Both catalysts are active.

The results shown in Table III are primarily concerned with catalyst deactivation/solubilization and the amounts of catalyst residue retained in the polymer resulting from such treatment. Run 2 shows that mesityl oxide alone provides significant deashing with respect to Ti and Al and is moderately effective for removing Cl residues. However, when it is used in combination with the chelating agent acetylacetone, the results obtained in runs 3 and 4 compare favorably with the prior art actylacetone/propylene oxide system shown in run 5.

After removal of the n-heptane wash liquids in the filter each polymer was subsequently washed with a second liquid to remove additional catalyst residues. The wash liquids employed and the number of washes used are given in Table IV.

TABLE IV

| | Second and Third Washes Employed with Each Run | | | |
|---|---|---|---|---|
| Run Number | Wash Liquids | | Number of Washes | Comments |
| | Second | Third | | |
| 1 | none | none | na[a] | none recorded |

TABLE IV-continued

Second and Third Washes Employed with Each Run

| Run Number | Wash Liquids Second | Third | Number of Washes | Comments |
|---|---|---|---|---|
| 2 | Isopropanol | 4-MP-1 | 3/1[b] | nothing unusual, no color |
| 3 | n-heptane | none | 1 | monomer and polymer had yellow tint |
| 4 | Isopropanol | none | 1 | monomer and polymer had yellow tint |
| 5 | Isopropanol | none | 2 | nothing unusual, no color |

[a]na = not applicable.
[b]3/1 = 3 washes with second wash liquid and 1 wash with third wash liquid.

Runs 1 through 5 and the data shown in Table III demonstrate that a dicarbonyl compound and an alpha,-beta-unsaturated ketone can be used to effectively deactivate and deash hydrocarbon polymers made using a transition metal/organometal catalyst system. More particularly, it was demonstrated that mesityl oxide and acetylacetone can be used to terminate the polymerization reaction and transform the insoluble transition metal halide catalyst into transition metal complexes and organic halides which are soluble the wash liquid.

Several additional conclusions can be reached by combining the catalyst residue results of Table II with their equivalents from Table IV. First, isopropanol is slightly more effective than n-heptane as a wash in removing solubilized Ti from the polymer and substantially more effective in removing solubilized Al (compare run 3 with run 4 shown in Table IV). Following treatment, it was noted that the polymer and monomer had a yellow tint. In run 2, Table IV, the mesityl oxide-treated polymer was washed 3 times with isopropanol and once with 4-MP-1. The treated polymer was colorless. Based on this run it is believed that if the polymer of runs 3 and 4 of Table IV were washed two or more times with the second liquid shown the treated polymers would also be colorless.

While the processes and compositions of this invention have been described in detail for the purpose of illustration, the inventive processes and compositions are not to be construed as limited thereby. This patent is intended to cover all changes and modifications within the spirit and scope thereof.

That which is claimed is:

1. A process for producing at least one polymer of 1-olefins comprising:
   (a) subjecting at least one 1-olefin to polymerization conditions in the presence of a catalyst composition wherein said catalyst composition comprises at least one component being a halide of a metal selected from the group consisting of Groups IV, V, VI and VIII of the Periodic Chart of the Elements; and
   wherein said catalyst composition further comprises at least one component selected from the group consisting of elemental metal, organometal compounds and mixtures thereof, the metal being selected from Groups I, II and III of the Periodic Chart;
   to form a polymerization reaction mixture having therein said at least one polymer;
   (b) treating said polymerization reaction mixture with a alpha,beta-unsaturated ketone;
   (c) separating said at least one polymer from said reaction mixture.

2. A process for producing at least one polymer of 1-olefins comprising:
   (a) subjecting at least one 1-olefin to polymerization conditions in the presence of a catalyst composition wherein said catalyst composition comprises at least one component being a halide of a metal selected from the group consisting of Groups IV, V, VI and VIII of the Periodic Chart of the Elements; and
   wherein said catalyst composition further comprises at least one component selected from the group consisting of elemental mental, organometal compounds and mixtures thereof, the metal being selected from Groups I, II and III of the Periodic Chart;
   to form a polymerization reaction mixture;
   (b) treating said polymerization reaction mixture with deashing agents consisting essentially of at least one alpha,beta-unsaturated ketone and at least one dicarbonyl compound;
   (c) separating said at least one polymer from said reaction mixture.

3. A process as recited in claim 1 wherein any unreacted portion of said alpha,beta-unsaturated ketone is separated from said reaction mixture along with residues of said catalyst composition and any chelated metals.

4. A process as recited in claim 2 wherein any unreacted portion of said alpha,beta-unsaturated ketone is separated from said reaction mixture along with residues of said catalyst composition and any chelated metals.

5. A process as recited in claim 1 wherein said at least one 1-olefin comprises a branched 1-olefin.

6. A process as recited in claim 5 wherein said branched 1-olefin comprises 4-methyl-1-pentene.

7. A process as recited in claim 5 wherein said at least one 1-olefin comprises a copolymer of a branched 1-olefin and a linear 1-olefin.

8. A process as recited in claim 2 wherein said at least one 1-olefin comprises a branched 1-olefin.

9. A process as recited in claim 8 wherein said branched 1-olefin comprises 4-methyl-1-pentene.

10. A process as recited in claim 8 wherein said at least one 1-olefin comprises a copolymer of a branched 1-olefin and a linear 1-olefin.

11. A process as recited in claim 1 wherein said at least one alpha,beta-unsaturated ketone is one selected from the group of ketones within the formula:

$$R_1-\underset{\underset{O}{\|}}{C}=CH\underset{R_2}{\overset{R_2}{|}}C-R_3$$

wherein $R_1$ and $R_2$ are hydrogen or alkyl or alkoxy groups having 1 to about 8 carbon atoms; and
wherein $R_3$ is an alkyl or alkoxy group having 1 to about 8 carbon atoms; and
wherein $R_1$, $R_2$ and $R_3$ can be the same or different.

12. A process as recited in claim 2 wherein said at least one dicarbonyl compound is one selected from the group of (a) compounds of the general formula:

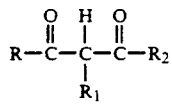

and (b) compounds of the general formula:

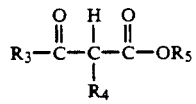

wherein R and $R_2$ are groups selected from alkyl, cycloalkyl, aryl, aralkyl, alkaryl, alkylcycloalkyl, cycloalkyalkyl groups and structures wherein R and $R_2$ are joined to form a cyclic structure;
wherein R and $R_2$ do not have to be the same;
wherein $R_1$ is selected from the group of hydrogen, alkyl, cycloalkyl, aryl, alkaryl, aralkyl, alkylcycloalkyl, and cycloalkylalkyl groups;
wherein $R_1$ does not have to be the same as R;
wherein $R_1$ does not have to be the same as $R_2$;
wherein $R_3$ is selected from the group of alkyl, cycloalkyl, aryl, aralkyl, alkaryl, alkylcycloalkyl, cycloalkylalkyl and $OR_5$ groups;
wherein $R_4$ is selected from the group of hydrogen and alkyl, cycloalkyl, aryl, aralkyl, alkaryl, alkylcycloalkyl, cycloalkylalkyl and $OR_5$ groups;
wherein $R_3$ and $R_4$ do not have to be the same;
wherein $R_5$ is selected from the group of alkyl, cycloalkyl, aryl, aralkyl, alkaryl, alkylcycloalkyl, cycloalkylalkyl;
wherein $R_3$ and $R_5$ do not have to be the same; and
wherein $R_4$ and $R_5$ do not have to be the same.

13. A process as recited in claim 1 wherein said at least one alpha,beta-unsaturated ketone is selected from the group of 4-methyl-3-pentene-2-one, 4-methyl-3-hexene-2-one, 4-methyl-3-heptene-2-one, 4-methyl-3-octene-2-one, 4-ethyl-3-heptene-2-one, 4-ethyl-3-octene-2-one, 2-methyl-2-hexene-4-one, 2-methyl-2-heptene-4-one, 2-methyl-2-octene-4-one, 3-methyl-3-heptene-4-one, 3-methyl-3-octene-4-one, and mixtures thereof.

14. A process as recited in claim 1 wherein said at least one alpha,beta-unsaturated ketone is mesityl oxide.

15. A process as recited in claim 2 wherein said at least one dicarbonyl compound is selected from the group of 2,4-pentanedione (acetylacetone), 2,4-hexanedione, 2,4-heptanedione, 5-methyl-2,4-hexanedione, 2,4-octanedione, 5,5-dimethyl-2,4-hexanedione, 3-ethyl-2,4-pentanedione, 2,2-dimethyl-3,5-nonanedione, 1-cyclohexyl-1,3-butanedione, 5,5-dimethyl-1,3-cyclohexanedione, 1-phenyl-1,3-butanedione, 1-(4-biphenylyl)-1,3-butanedione, 1-phenyl-1,3-pentanedione, 1-phenyl-5,5-dimethyl-2,4-hexanedione, 1,3-diphenyl-1,3-propanedione, 1,4-diphenyl-1,3-butanedione, 1-phenyl-2-benzyl-1,3-butanedione, 1-phenyl-3-benzyl-9,11-nonadecanedione, 8,10-heptadecanedione, 8-ethyl-7,9-heptadecanedione, 6-octyl-5,7-undecanedione, 4-phenyl-3,5-heptanedione, 1,3-cyclohexanedione, ethyl acetoacetate, methyl acetoacetate, n-propyl acetoacetate, isopropyl acetoacetate, tert-butyl acetoacetate, diethyl malonate, dimethyl malonate, di-n-propyl malonate, diisopropyl malonate, di-tert-butyl malonate, octyl acetoacetate, heptyl acetoacetate, phenyl acetoacetate, diphenyl malonate, dicyclohexyl malonate, dicyclohexyl octylmalonate, dihexyl phenylmalonate, ethyl 3-oxopentanoate, octyl-3-oxoundecanoate, methyl 3-oxo-4-phenylbutanoate, ethyl 3-oxo-5-phenylpentanoate, octyl 3-oxo-2-phenylundecanoate, octyl 3-oxo-2-octylundecanoate, cyclohexyl 3-oxo-6-cyclopentylhexanoate, and mixtures thereof.

16. A process as recited in claim 2 wherein said at least one dicarbonyl compound is acetylacetone.

17. A process as recited in claim 1 wherein said catalyst composition further comprises a prepolymer catalyst.

18. A process as recited in claim 17 wherein said prepolymer catalyst comprises a 1-olefin polymer.

19. A process as recited in claim 2 wherein said catalyst composition further comprises a prepolymer catalyst.

20. A process as recited in claim 19 wherein said prepolymer catalyst comprises a 1-olefin polymer.

21. A process as recited in claim 1 wherein said at least one 1-olefin comprises 4-methyl-1-pentene;
wherein said catalyst composition comprises titanium trichloride and a diethylaluminum chloride cocatalyst; and
wherein said alpha,beta-unsaturated ketone is mesityl oxide.

22. A process as recited in claim 2
wherein said at least one 1-olefin comprises 4-methyl-1-pentene;
wherein said catalyst composition comprises titanium trichloride and a diethylaluminum chloride cocatalyst.
wherein said alpha,beta-unsaturated ketone is mesityl oxide; and
wherein said dicarbonyl compound is acetylacetone.

* * * * *

UNITED STATES PATENT AND TRADEMARK OFFICE
CERTIFICATE OF CORRECTION

PATENT NO. : 5,331,086
DATED : July 19, 1994
INVENTOR(S) : Phil M. Stricklen et al It is certified that error appears in the above-identified patent and that said Letters Patent is hereby corrected as shown below:

Claim 1, column 11, line 66, insert --- deashing agent consisting essentially of at least one --- after "a".

Claim 13, column 13, line 38, delete "4-methyl-3-pentene-2 -one" and insert --- 4-methyl-3-penten-2-one --- therefor.

Claim 13, line 40, delete "octene-2- one" and insert --- octene-2-one --- therefor.

Claim 22, line 43, delete ":" after "least".

Signed and Sealed this

Twenty-fifth Day of October, 1994

Attest:

BRUCE LEHMAN

Attesting Officer     Commissioner of Patents and Trademarks